(12) United States Patent
Sarawat et al.

(10) Patent No.: US 11,432,259 B2
(45) Date of Patent: Aug. 30, 2022

(54) WIRELESS BASE STATION AND LOCATION MANAGEMENT

(71) Applicant: Charter Communications Operating, LLC, St. Louis, MO (US)

(72) Inventors: Vikas Sarawat, Broomfield, CO (US); Charles I. Cook, Castle Rock, CO (US); Praveen C. Srivastava, Ashburn, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 1 day.

(21) Appl. No.: 17/004,653

(22) Filed: Aug. 27, 2020

(65) Prior Publication Data

US 2022/0070817 A1    Mar. 3, 2022

(51) Int. Cl.
| | |
|---|---|
| *H04W 72/00* | (2009.01) |
| *H04W 64/00* | (2009.01) |
| *H04W 72/04* | (2009.01) |
| *H04W 88/16* | (2009.01) |

(52) U.S. Cl.
CPC ....... *H04W 64/003* (2013.01); *H04W 72/048* (2013.01); *H04W 88/16* (2013.01)

(58) Field of Classification Search
CPC .. H04W 64/003; H04W 72/048; H04W 88/16
USPC ........................................ 455/452.1
See application file for complete search history.

(56) References Cited

U.S. PATENT DOCUMENTS

| | | | | |
|---|---|---|---|---|
| 2007/0011704 A1* | 1/2007 | Anglin | ............. | H04N 21/25891 725/46 |
| 2011/0230195 A1* | 9/2011 | Li | ........................ | H04L 65/1006 455/445 |
| 2012/0135722 A1* | 5/2012 | Jiang | ........................ | H04W 8/12 455/415 |
| 2019/0058999 A1* | 2/2019 | Gunasekara | ...... | H04W 36/0022 |
| 2020/0106577 A1* | 4/2020 | Chen | ..................... | H04W 72/14 |

* cited by examiner

Primary Examiner — Tanmay K Shah
(74) Attorney, Agent, or Firm — Armis IP Law, LLC

(57) ABSTRACT

A communication management resource such as a domain proxy receives a request transmitted from a wireless base station. The wireless station generates the request to register the wireless base station for subsequent allocation of wireless channels. In response to receiving the request, the communication management resource maps an identity of the wireless base station to a geographical location in which the wireless base station resides and forwards the request and notification of the geographical location to a channel allocation resource (a.k.a., allocation management resource) that allocates use of the wireless channels in a region in which the geographical location resides.

35 Claims, 10 Drawing Sheets

MAP
INFORMATION
160

| CBSD ID VALUE | NETWORK ADDRESS |
|---|---|
| CBSD-UIV12 | XAAY |
| CBSD-UIV32 | XAAB |
| CBSD-UIV45 | XXXY |
| CBSD-UIV49 | XCCC |
| CBSD-UIV67 | XYYA |
| ... | |

FIG. 2

BILLING
INFO.
164

| SUBSCRIBER DOMAIN | GATEWAY ID | LOCATION |
|---|---|---|
| ... | ... | |
| S.D. 149 | GW 223 (NA: CCCD) | L7 |
| S.D. 150 | GW 121 (NA: ABCC) | L1 |
| S.D. 152 | GW 124 (NA: ABFF) | L2 |
| ... | ... | |

FIG. 4

WIRELESS BASE STATION AND LOCATION MANAGEMENT

BACKGROUND

It is often desirable to determine a location of a wireless station operating in a wireless network environment. Thus, wireless stations often include GPS (Global Positioning System) capability enabling a respective wireless station to determine its location, whether fixed or changing over time because the wireless station is mobile.

Another way to determine a location of a wireless station is to access configuration information manually generated by a so-called Certified Professional Installer (CPI) that installs the wireless station at a fixed location. Manual generation and storage of location information by the installer for a wireless station is particularly useful in circumstances in which the wireless station resides indoors because GPS (Global Positioning System) technology relies on use of satellites to determine a location of a wireless station.

BRIEF DESCRIPTION OF EMBODIMENTS

This disclosure includes the observation that determination of a location of a wireless base station in a wireless network environment and allocation of wireless channels suffer from deficiencies. For example, as previously discussed, GPS technology is not always reliable to accurately determine a location of a wireless base station that is located indoors. Additionally, manual generation and storage of location information for respective wireless base station is tedious and time consuming for an installer.

In contrast to conventional techniques, embodiments herein include providing improved location determination of a wireless base station and allocation of wireless channels in a wireless network environment.

More specifically, a communication management resource such as a so-called domain proxy or other suitable entity resides in between a wireless base station and a channel allocation resource (a.k.a., an allocation management resource) such as a spectrum access system. The communication management resource receives a request transmitted from a wireless base station. The wireless station generates the request to register the wireless base station for subsequent allocation of wireless channels. In response to receiving the request, the communication management resource initiates mapping of an identity of the wireless base station (or other suitable information in the received communication) to a geographical location in which the wireless base station resides. After determining the location of the wireless base station, the communication management resource forwards the request and notification of the geographical location of the wireless base station to the channel allocation resource that registers the wireless base station and allocates use of bandwidth such as one or more wireless channels in a region in which the geographical location resides.

In one embodiment, via mapping, the identity of the wireless base station maps directly or indirectly to the geographical location in which the wireless base station resides.

In further example embodiments, prior to receiving the request, the communication management resource stores one or more maps (such as mapping information) correlating the unique identifier value (such as a CBSD identity value or other unique information) correlating the wireless base station to a network address assigned to the wireless base station. Note that storage of maps can be local to the communication management resource or remote such as in a centralized database or in the Cloud. A converter resource uses the determined address of the wireless base station (such as derived from the identity of the wireless base station) to identify its location in the wireless network environment. In one embodiment, the identity of the wireless base station is a unique identifier value assigned to a respective CBSD (Citizens Broadband radio Service Device), which may be mobile or stationary.

In accordance with further example embodiments, mapping the identity of the wireless base station to the geographical location includes, via the converter resource and/or communication management resource, retrieving the identity of the wireless base station from the request and determining the geographical location of the wireless base station from the retrieved identity of the wireless base station.

Further embodiments herein include, via the communication management resource or other suitable entity such as an information management resource, storing information correlating the identity of the wireless base station to the geographical location. In one embodiment, the stored information includes: i) map information correlating the identity of the wireless base station to a network address assigned to the wireless base station; ii) connectivity information indicating installation of the wireless base station in a subscriber domain and connectivity of the wireless base station to a gateway communication device in the subscriber domain at the geographical location; and iii) location information indicating that the gateway communication device resides at the geographical location.

In still further example embodiments, the communication management resource or other suitable entity (such as a converter resource) utilizes the map information, connectivity information, and/or the location information to map the identity of the wireless base station to location information indicating the geographical location. In one embodiment, the communication management resource manages communications between the functions as described herein; the converter resource handles mapping and translations functions as described herein. Such resources can be separate or combined depending on the embodiment.

Yet further example embodiments herein include, via the communication management resource or other suitable entity, prior to receiving the request: i) storing location information indicating that a gateway communication device resides in a vicinity of or at the geographical location of the wireless base station; ii) detecting connectivity of the wireless base station to the gateway communication device through which the wireless base station transmits the request, the detected connectivity including receipt or determination of a network address assigned to the wireless base station; and iii) based on the detected connectivity, storing connectivity information indicating the connectivity of the wireless base station to the gateway communication device.

Yet further example embodiments herein include, via the communication management resource or other suitable converter resource or entity such as an identity to location converter, translating an identity of the wireless base station to the network address of the wireless base station; detecting from the network address of the wireless base station and the connectivity information that the wireless base station is coupled to the gateway communication device; determining from the stored location information that gateway communication device resides at the geographical location; and using the determined geographical location as a location of the wireless base station in response to detecting that the gateway communication device resides at the geographical location and that the wireless base station is coupled to the gateway communication device.

Still further example embodiments herein include, via the communication management resource, receiving a message from the allocation management resource that allocates a wireless channel to the wireless base station and notifying the wireless base station of the wireless channel allocated to the wireless base station.

In one nonlimiting example embodiment, as previously discussed, embodiments herein include receiving the request at a domain proxy (a.k.a. communications management resource) and forwarding the request and notification of the geographical location from the domain proxy to the allocation management resource.

Note that the channel allocation management resource can be configured to allocate channels from any available wireless spectrum. For example, in one embodiment, the allocation management resource allocates use of the wireless channels from a tiered wireless communication hierarchy in which an incumbent user (such as government user or other suitable entity) is ranked higher in priority than the wireless base station to receive allocation of wireless channels. Based on the hierarchy, the incumbent user can revoke use of the one or more wireless channels allocated to the wireless base station for its own use. In one embodiment, the wireless spectrum is shared, but not tiered.

In still further example embodiments, the wireless base station at the determined geographical location supports connectivity with communication devices via the allocated wireless channels, the wireless channels being CBRS (Citizens Band Radio Service) bandwidth.

Embodiments herein are useful over conventional techniques. For example, embodiments herein provide a unique way of determining a location of a wireless station for allocation of wireless channels without burdening the wireless base station with the task of learning its location and communicating such information in a registration request to an allocation management resource. Instead, the communication management resource intercepts a message to identify a location of the requesting wireless base station and forwards such location information and the request to an allocation management resource.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate location detection and allocation of one or more wireless channels in a network environment. The instructions, when executed by computer processor hardware, cause the computer processor hardware (such as one or more co-located or disparately processor devices or hardware) to: receive a request transmitted from a wireless base station, the request generated to register the wireless base station for subsequent allocation of wireless channels; map an identity of the wireless base station to a geographical location in which the wireless base station resides; and forward the request and notification of the geographical location to an allocation management resource that allocates use of the wireless channels in a region in which the geographical location resides.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating map information according to embodiments herein.

FIG. 4 is an example diagram illustrating billing information according to embodiments herein.

Figure 1:
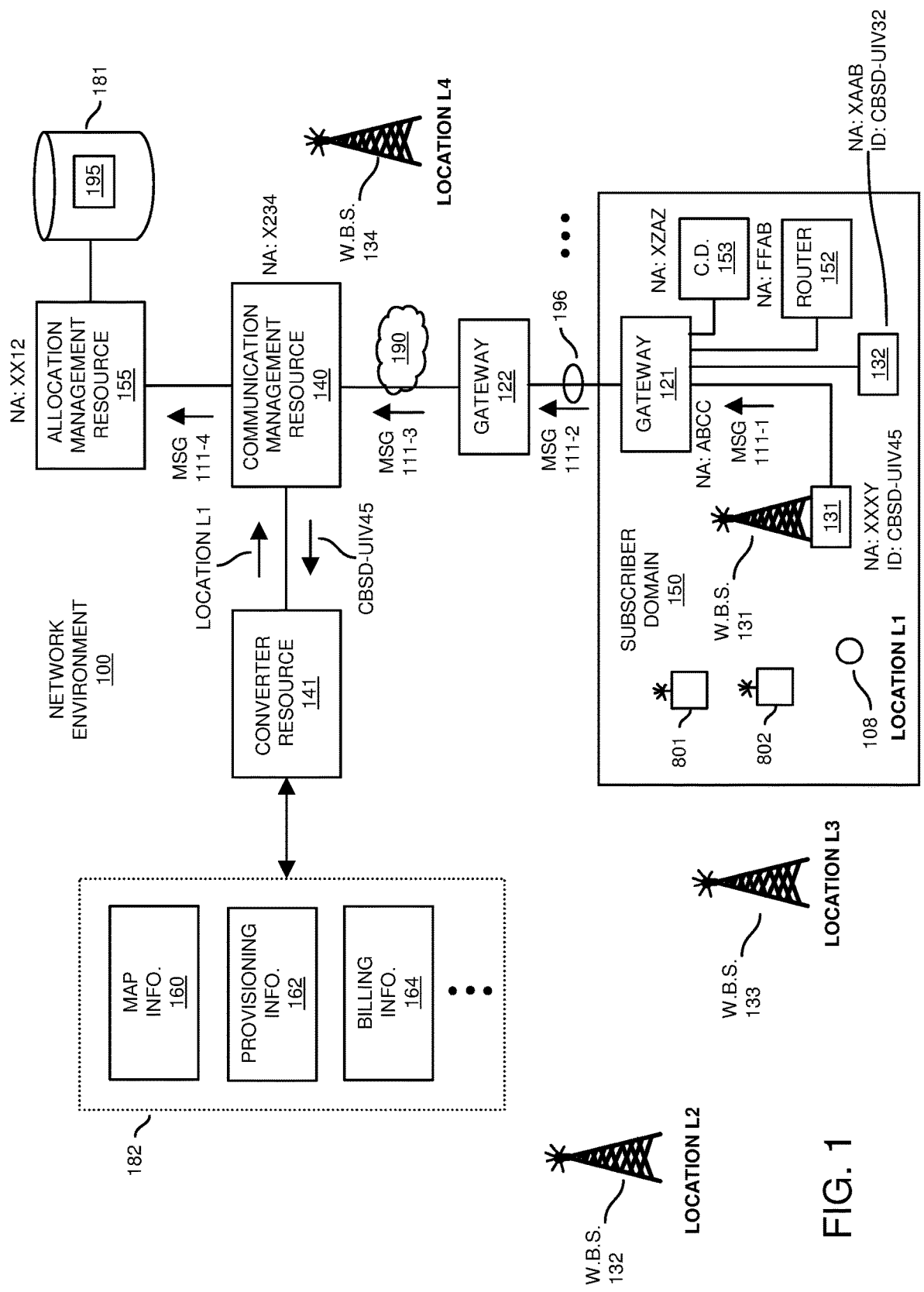
FIG. 1 is an example diagram illustrating a communication network environment and respective interconnectivity of devices according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a communication management resource disposed in a network environment. The communication management resource such as a so-called domain proxy receives a request transmitted from a wireless base station. The wireless base station (such as a CBSD or Citizens Broadband radio Service Device) generates the request to register the wireless base station for subsequent allocation of wireless channels from an allocation management resource.

In response to receiving the request, the communication management resource initiates conversion of an identity of the wireless base station via a converter resource to a geographical location in which the wireless base station resides. The communication management resource then forwards the request and notification of the geographical location of the wireless base station to a channel allocation management resource that allocates use of the wireless channels in a region in which the geographical location resides.

The geographical location of the wireless base station is needed by the channel allocation management resource in order to determine proper allocation of bandwidth to multiple communication devices in the wireless network environment. The proper allocation of wireless channels in a network environment ensures that the multiple communication devices (such as wireless base stations) in close proximity to each other do not interfere with each other using the same assigned wireless channels.

Now, more specifically, with reference to the drawings, FIG. 1 is an example diagram illustrating a communication network environment and respective wireless connectivity according to embodiments herein.

As shown, network environment 100 includes multiple wireless base stations including wireless base station 131 at location L1, wireless base station 132 at location L2, wireless base station 133 location L3, wireless base station 134 at location L4, etc. In one embodiment, due to the nearness of the wireless base stations with respect to each other, they are susceptible to causing interference when using the same wireless channel to communicate with one or more respective communication devices.

As further shown, the wireless base station 131 (a.k.a., wireless station, communication device, customer premises equipment, etc.) resides in the subscriber domain 150 and is assigned a network address of XXXY and CBSD identifier value (a unique identifier value) of CBSD-UIV45. In one embodiment, the network address XXXY is a static IP address assigned to the wireless base station 131. The network address XXXY supports routing of communication to and from the wireless base station 131.

In one non-limiting example embodiment, subscriber domain 150 represents a residence (such as a home environment) of a respective subscriber 108 subscribing to services associated with use of a communication link 196 which may be shared between gateway 121 and gateway 122 as with a cable network service or PON (Passive Optical Network) service, or dedicated between gateway 121 and gateway 122 as in an xDSL (x Digital Subscriber Line) service or a dedicated fiber service. In one embodiment, communication link 196 transports traffic from multiple UEs 801, 802, etc. (a.k.a., User Equipment) used by respective subscribers 108.

As further shown, the network service provider associated with the communication link 196 provides the subscriber domain 150 and corresponding subscriber 108 access to a remote network 190 (such as the Internet) via the gateway 121 such as a cable MODEM (such as supporting DOCSIS or other communication protocols) or other suitable type of communication device disposed in the subscriber domain 150. The gateway 121 in this example embodiment is assigned a network address (unique identifier value) of ABCC.

Further in this example embodiment, the gateway 121 is in communication with gateway 122 such as a CMTS (Cable Modem Termination System) or other suitable type of device. In one embodiment, the gateway 122 is an end terminal or conduit for multiple cable MODEMs in respective subscriber domains of network environment 100.

In accordance with further example embodiments, the gateway 121 is a so-called ONU (Optical Network Unit); the gateway 122 is a so-called OLT (Optical Line Termination).

In yet further example embodiments, the gateway 121 is an ethernet switch; the gateway 122 is an Ethernet Aggregation Switch.

Network environment 100 further includes communication management resource 140 such as a domain proxy. Communication management resource 140 is in communication with network 190, converter resource 141, and allocation management resource 155. Note that, if desired, any of one or more of the resources and corresponding functionality such as communication management resource 140, converter resource 141, and allocation management resource 155 can be combined into the communication management resource 140.

In general, the communication management resource 140 (such as a domain proxy) is responsible for managing communications on behalf of the allocation management resource 155. For example, rather than the wireless base stations in network environment 100 communicating directly with the allocation management resource 155 (to perform operations such registration, channel requests, etc.), the wireless base stations communicate with the communication management resource 140. The communication management resource 140 processes and forwards the communications in an appropriate format to the allocation management resource 141 (such as a spectrum access system).

As its name suggests, the converter resource 141 (a.k.a., location look-up resource) in this example embodiment is configured to convert a respective received identifier value or other suitable information associated with a wireless base station 131 to a corresponding location value (location information such as latitude-longitude geographical coordinates, mailing address, etc.), which is then provided to the communication management resource 140. As previously discussed, embodiments herein alleviate the wireless base station 131 from having to provide its location to the communication management resource 140 and/or allocation management resource 155.

To support the conversion of received information associated with the wireless base station into a location value, the converter resource 141 has access to the repository 182 including map information 160, provisioning information 162, billing information 164, etc.

Note that the components in network environment 100 can be instantiated in a suitable manner. For example, the wireless base station 131 can be implemented as wireless base station hardware, wireless base station software, or a combination of wireless base station hardware and wireless base station software; each of the gateway 121 and gateway 122 can be implemented as gateway hardware, gateway software, an instantiation of gateway functionality on a virtualization platform or a combination of gateway hardware and gateway software and instantiation of gateway functionality on a virtualization platform; communication management resource 140 can be implemented as communication management hardware, communication management software, an instantiation of communication management functionality on a virtualization platform, or a combination of communication management hardware and communication management software and an instantiation of communication management functionality on a virtualization platform; converter resource 141 can be implemented as converter hardware, converter software, an instantiation of converter resource functionality on a virtualization platform, or a combination of converter hardware and converter software and an instantiation of converter resource functionality on a virtualization platform; allocation management resource 155 can be implemented as allocation management hardware, allocation management software, an instantiation of allocation management functionality on a virtualization platform or a combination of allocation management hardware and allocation management software and an instantiation of allocation management functionality on a virtualization platform; etc.

FIG. 2 is an example diagram illustrating map information according to embodiments herein.

As shown in FIG. 2, the map information 160 provides a mapping of a respective wireless base station identifier value (such as a CBSD identity value) to a network address assigned to and (potentially permanently stored in) the respective wireless base station.

Note that the map information 160 can be received and/or generated by any suitable resource. For example, in one embodiment, a manufacturer of the respective wireless base stations produces the map information 160, which provides a mapping between a respective CBSD identity value of each of the wireless base stations and corresponding network address assigned to the respective wireless base station.

In this example embodiment, the map information 160 indicates that a respective wireless base station assigned identity CBSD-UIV12 is also assigned network address XAAY; the map information 160 indicates that a respective wireless base station assigned identity CBSD-UIV32 is also assigned network address XAAB; the map information 160 indicates that a respective wireless base station assigned identity CBSD-UIV45 is also assigned network address XXXY; the map information 160 indicates that a respective wireless base station assigned identity CBSD-UIV49 is also assigned network address XCCC; the map information 160 indicates that a respective wireless base station assigned identity CBSD-UIV67 is also assigned network address XYYA; and so on.

Referring again to FIG. 1, note that it is possible for multiple wireless stations assigned different unique CBSD ID values to be coupled to the same gateway 121. For example, two wireless base stations (e.g., a first wireless base station 131 such as assigned CBSD-UIV45 and a second wireless base station 132 such as assigned CBSD-UIV32) can be connected to the same gateway 121 at the same location L1 for capacity reasons. In such an instance, as further discussed herein, when the allocation management resource 155 allocates respective wireless channels to the wireless base stations, the allocation management resource 155 would recognize that they are in the same geographical location L1 and assign them different wireless channels so as to not interfere with each other.

Figure 3:
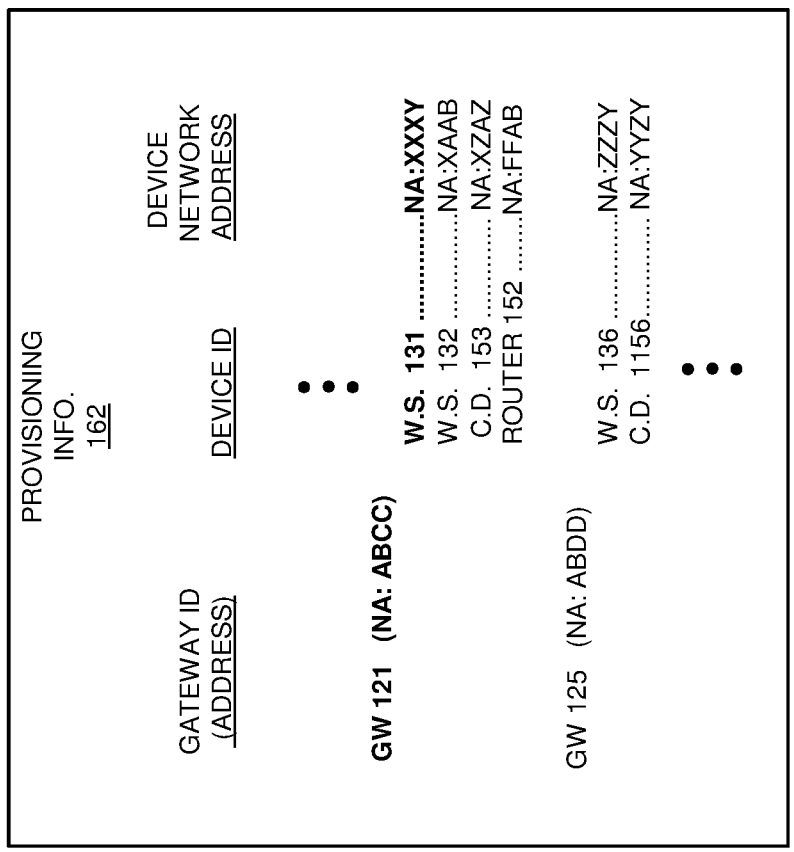
FIG. 3 is an example diagram illustrating provisioning information (such as indicating connectivity of one or more devices to a gateway resource in a subscriber domain) according to embodiments herein.

FIG. 3 is an example diagram illustrating provisioning information (such as indicating connectivity of one or more devices to a gateway resource in a subscriber domain) according to embodiments herein.

In this example embodiment, the provisioning information 162 tracks the identity of different communication devices coupled to and communicating through the gateway 121. For example, each time a communication device is coupled to the gateway 121 (assigned network address ABCC) in the subscriber domain 150, the provisioning information 162 is updated to reflect such devices.

As shown in FIG. 3, the provisioning information 162 associated with subscriber domain 150 indicates that wireless station 131 assigned network address XXXY is communicatively coupled to the gateway 121 (assigned network address ABCC) through which the wireless base station 131 has to access network 190; the provisioning information 162 indicates that communication device 153 assigned network address XZAZ is communicatively coupled to the gateway 121 through which the communication device 153 has access to network 190; the provisioning information 162 indicates that router 152 assigned network address FFAB is communicatively coupled to the gateway 121 through which the router 152 has access to network 190; and so on.

The provisioning information 162 such as associated with a second subscriber domain indicates that wireless station 136 assigned network address ZZZY is communicatively coupled to the gateway 125 (assigned network address ABDD) through which the wireless base station 136 has to access network 190; the provisioning information 162 indicates that communication device 1156 assigned network address YYZY is communicatively coupled to the gateway 125 through which the communication device 1156 has access to network 190; and so on.

FIG. 4 is an example diagram illustrating billing information according to embodiments herein.

In this example embodiment, the billing information 164 (or other suitable information) tracks the identity of different gateways provided to subscribers and where the gateways are located in the network environment 100.

For example, the billing information 164 indicates that the gateway 223 (assigned network address CCCD) is located in subscriber domain 149 residing at location L7; the billing information 164 indicates that the gateway 121 (such as a cable MODEM assigned network address ABCC) is located in subscriber domain 150 residing at location L1; the billing information 164 indicates that the gateway 124 (assigned network address ABFF) is located in subscriber domain 152 at location L2; and so on.

Figure 5:
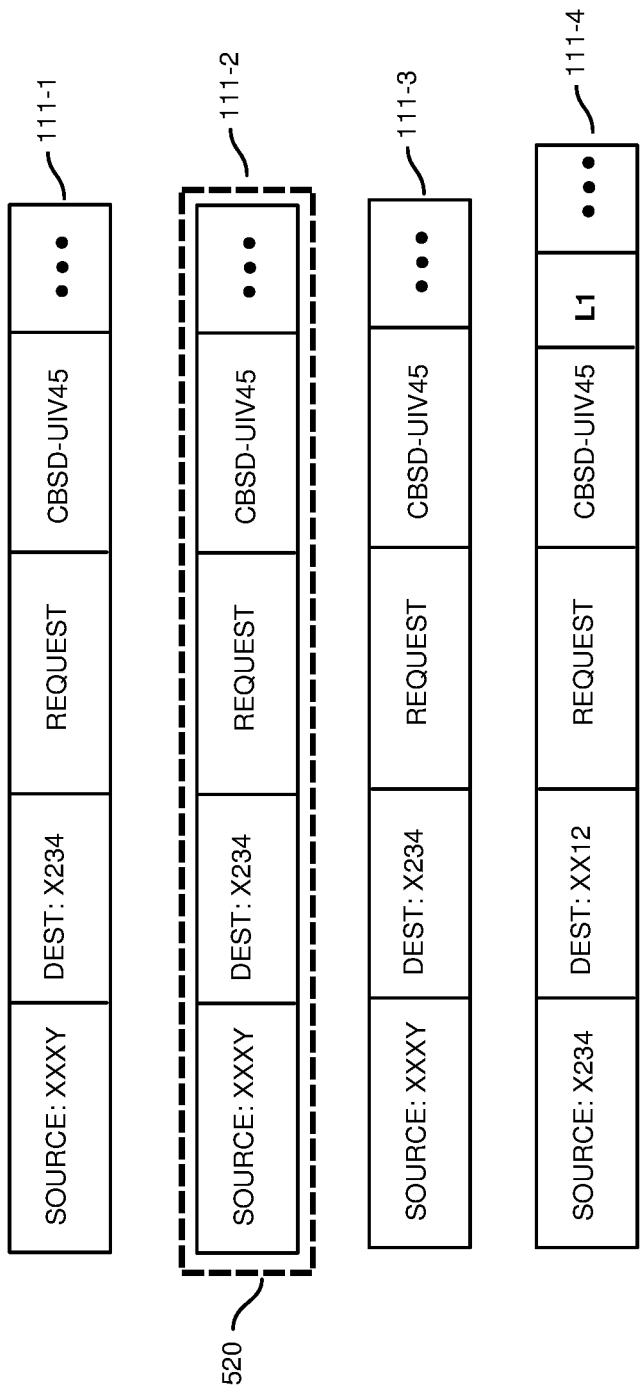
FIG. 5 is an example diagram illustrating modification and variations of transmitted messages according to embodiments herein.

Referring again to FIG. 1 and corresponding FIG. 5 illustrating contents of respective messages, the wireless base station 131 generates and transmits communication 111-1 to the gateway 121. In one embodiment, the communication includes a request to register the wireless base station 131 with the allocation management resource 155.

For example, the communication 111-1 (as depicted in FIG. 1 and FIG. 5) includes the network address XXXY indicating that the wireless base station 131 is the source of communicating the communication 111-1; the communication 111-1 includes the network address X234 indicating that the communication management resource 140 is the destination to which the communication 111-1 is being transmitted; the communication 111-1 (as depicted in FIG. 1 and FIG. 5) includes a REQUEST to register the wireless base station 131 with the allocation management resource 155; the communication 111-1 (as depicted in FIG. 1 and FIG. 5) includes a unique identifier value (CBSD-UIV45) assigned to the wireless base station 131; and so on.

The gateway 121 receives and modifies the communication 111-1 to produce the communication 111-2. For example, in one embodiment, the gateway 121 applies encapsulation 520 to the communication 111-1 and forwards it to the gateway 122.

Gateway 122 removes the encapsulation 520 to produce the message 111-3, which is similar to the communication 111-1.

Gateway 122 forwards the communication 111-3 through network 190 to the communication management resource 140.

Communication management resource 140 detects that the communication 111-3 is a request to register the wireless base station 131 with the allocation management resource 155 and that the request and/or communication 111-3 does not include location information indicating a respective location of the wireless base station 131.

In such an instance, the communication management resource 140 retrieves the unique identifier value (such as CBSD-UIV45 or other suitable value) from the received communication 111-3 and forwards unique identifier value to the converter resource 141 for conversion into respective location information indicating the location of the wireless base station 131.

In accordance with more specific embodiments, the converter resource 141 uses one or more of the map information, provisioning information, and billing information 164, etc., to convert the received unique identifier value (from the received communications 111-3) associated with the wireless base station 131 into a respective location value indicating a location of the wireless base station 131.

For example, in one embodiment, the converter resource 141 uses the map information 160 to determine a respective network address assigned to the wireless base station 131. This can include mapping the unique identifier value CBSD-UIV45 received from the request message into the network address XXXY. Thus, although the converter resource 145 may not be aware of the network address assigned to the wireless base station 131 based on the received communications 111-1, the converter resource 141 is able to determine the network address of the wireless base station 131 via map information 160.

The converter resource 141 applies the identified network address XXXY to the provisioning information 162 in FIG. 3. Via the network address XXXY assigned to the wireless base station 131, the converter resource 141 maps the network address XXXY in the provisioning information 162 to the corresponding gateway 121 (assigned network address ABCC) through which the wireless base station 131 communicated the request message to the communication management resource 140.

In accordance with further example embodiments, the converter resource 141 uses the identity of the gateway 121 such as network address ABCC to determine the corresponding location of the wireless base station 131. More specifically, the converter resource 141 maps the identity (such as network address ABCC or other suitable value) of the gateway 121 to the location value L1.

As previously discussed, the location value L1 can take any suitable form such as latitude and longitude coordinates, post office mail address information, etc.

Note again that the technique of using the unique CBSD identifier value to determine the location of the wireless base station is shown by way of a non-limiting example embodiment. The information stored in repository 182 can include any information enabling the converter resource 141 and/or communication management resource 140 to identify the location of the wireless base station 131. For example, in one embodiment, the information stored in repository 182 can include information mapping the identity of the unique CBSD identifier value (such as CBSD-UIV45) directly to a location value such as L1.

Subsequent to determining the location of the wireless base station 131, as further shown in FIG. 1, the converter resource 141 communicates the location information L1 to the communication management resource 140.

In response to receiving the location information L1, the communication management resource 140 modifies the received communication 111-3 (message) and converts it into communication 111-4 (message) specifying the location, L1, of the wireless base station 131.

Thus, although the request communication 111-1 generated and transmitted by the wireless station 131 did not include any location information indicating its current location, the communication management resource 140 determines, via the converter resource 141, that the location of the wireless base station is location L1. The communication management resource 140 forwards the registration request message (communication 111-4) including the location information L1 to the allocation management resource 155.

Figure 6:
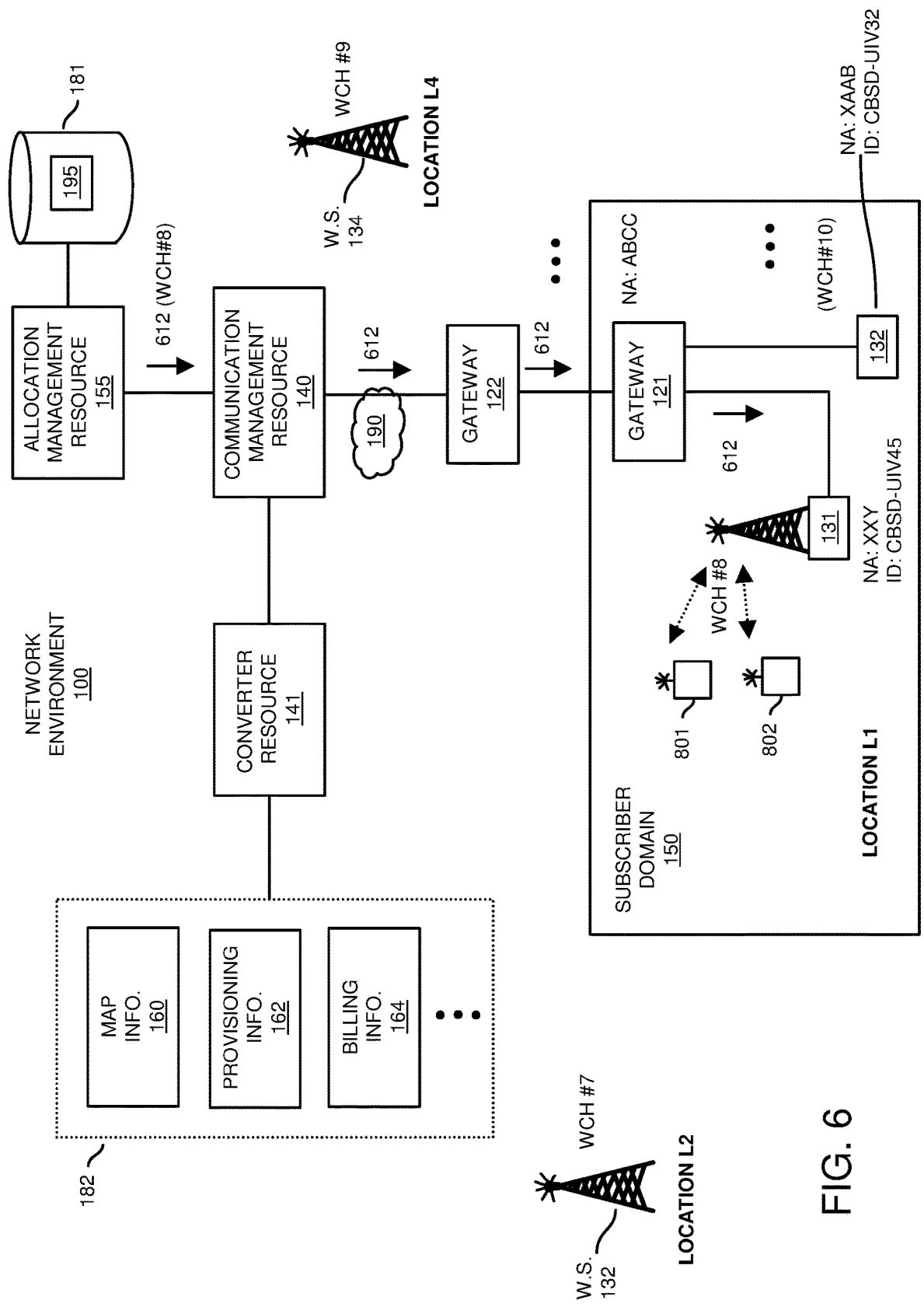
FIG. 6 is an example diagram illustrating allocation of wireless bandwidth to a communication device subsequent to its registration according to embodiments herein.

Subsequent to registration of the wireless base station 131 and verifying that the wireless base station 131 is a valid device in which to allocate one or more wireless channels, the allocation management resource 155 allocates one or more wireless channels for use by the wireless base station as further shown in FIG. 6.

FIG. 6 is an example diagram illustrating allocation of wireless bandwidth to a communication device subsequent to registration according to embodiments herein.

As previously discussed, in one embodiment, the allocation management resource 155 relies on locations of the wireless base stations in network environment 100 as a basis to allocate respective one or more wireless channels.

For example, the allocation management resource 155 allocates one or more respective wireless channels from available wireless bandwidth (such as CBRS bandwidth) such that the wireless base stations do not interfere with each other. As previously discussed, the allocation management resource 155 stores allocation information 195 in repository 181.

More specifically, in accordance with further example embodiments, subsequent to proper registration of the wireless base station 131 via one or more registration communications and validation of the wireless base station 131 as a CBSD device, the allocation management resource 155 such as a SAS (Spectrum Access System) or other suitable entity allocates one or more wireless channels for use by the wireless base stations present in the network environment 100.

Assume in this example embodiment, that the allocation management resource 155 selects wireless channel #8 for use by the wireless base station 131 because no other base stations in the vicinity of wireless base station 131 are using wireless channel #8 and such channel is available. For example, wireless base station 132 is allocated use of wireless channel #7, wireless base station 134 is allocated wireless channel #9, etc. Allocation and use of the wireless channel #8 by the wireless base station 131 do not interfere with any of wireless base stations 132, 134, etc.

Via communication 612, the allocation management resource 155 notifies the wireless base station 131 that wireless channel #8 has been allocated for its use. For example, in one embodiment, this notification includes transmitting the communication 612 specifying the wireless channel #8 to the communication management resource 140. The communication management resource 140 forwards the received communication 612 to the gateway 122. The gateway 122 forwards the communication to and through gateway 121 to the wireless base station 131.

In response to receiving allocation of the wireless channel #8, the wireless base station 131 provides conductivity of the communication devices 801, 802, etc., to the remote network 190 via communications through the combination of gateway 121 and gateway 122.

In one embodiment, in addition to requesting allocation of one or more wireless channels, the wireless base station 131 communicates heartbeat request messages to the allocation management resource 155 for continued notifications from the allocation management resource 155 that the wireless channel #8 can still be used by the wireless base station 131 to provide connectivity of one or more communication devices to the remote network 190.

As previously discussed, the wireless station 132 also can be coupled to gateway 121. In a similar manner as previously discussed, the wireless base station 132 registers and requests one or more wireless channels from the allocation management resource 155. Also, in a similar manner as previously discussed, the communication management resource 140 and/or converter resource 141 determine a location L1 of the requesting wireless base station 132 and forward the request and location information L1 to the allocation management resource 155 that, thereafter, allocates a different wireless channel such as wireless channel #10 (different carrier frequency than wireless channel #8) for use by the wireless base station 132.

Figure 7:
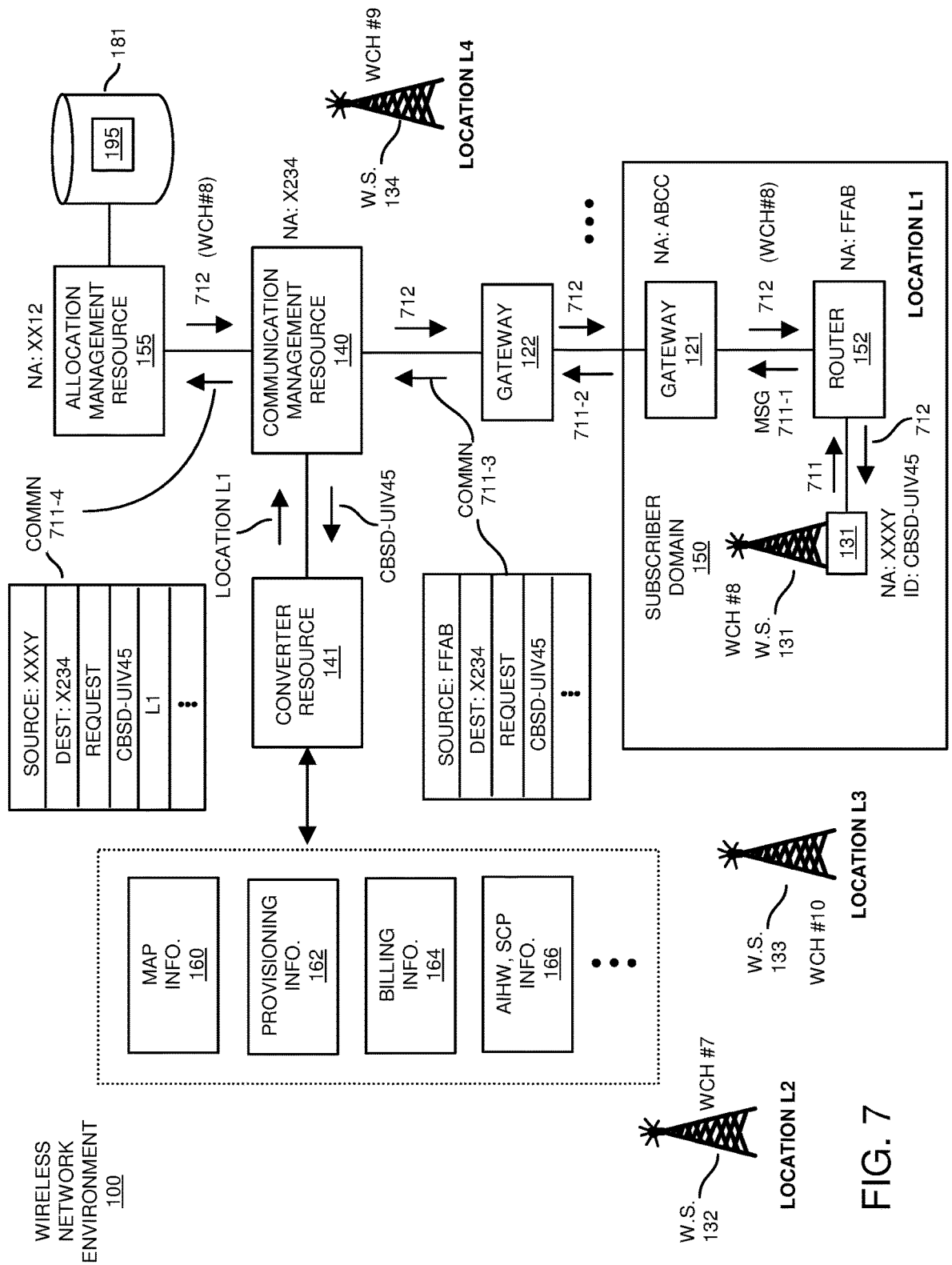
FIG. 7 is an example diagram illustrating a wireless station in communication with a gateway through a router according to embodiments herein.

FIG. 7 is an example diagram illustrating a wireless station in communication with a gateway through a router according to embodiments herein.

In this example embodiment, the wireless base station 131 is connected to the gateway 121 through the router 152.

In a similar manner as previously discussed, the wireless base station 131 communicates a registration request message 711 through the router 152 to the gateway 121. Gateway 121 communicates the communication 711 through the gateway 122 and remote network 190 to the communication management resource 140.

The communication management resource 140 retrieves and forwards the CBSD unique identifier value (CBSD-UIV45) to the converter resource 141. The converter resource 141 uses the unique identifier value to identify the location L1 of the wireless base station 131 via one or more sets of mapping information. The converter resource 141 forwards the location information L1 to the communication management resource 140.

Thus, in a similar manner as previously discussed, the allocation management resource 155 registers the wireless base station 131 for use of one or more available wireless channels based on receipt of the communications 711-4.

As further shown, the allocation management resource 155 allocates wireless channel #8 to the wireless base station 131. Via communications 712 from the allocation management resource 155 to the communication management resource 140, and further communications 712 directed to the wireless base station 131, the communication management resource 140 notifies the wireless base station 131 of the allocated wireless channel #8 for use by the wireless base station 131 to provide wirelessly connectivity to one or more communication devices in the subscriber domain 150.

Figure 8:
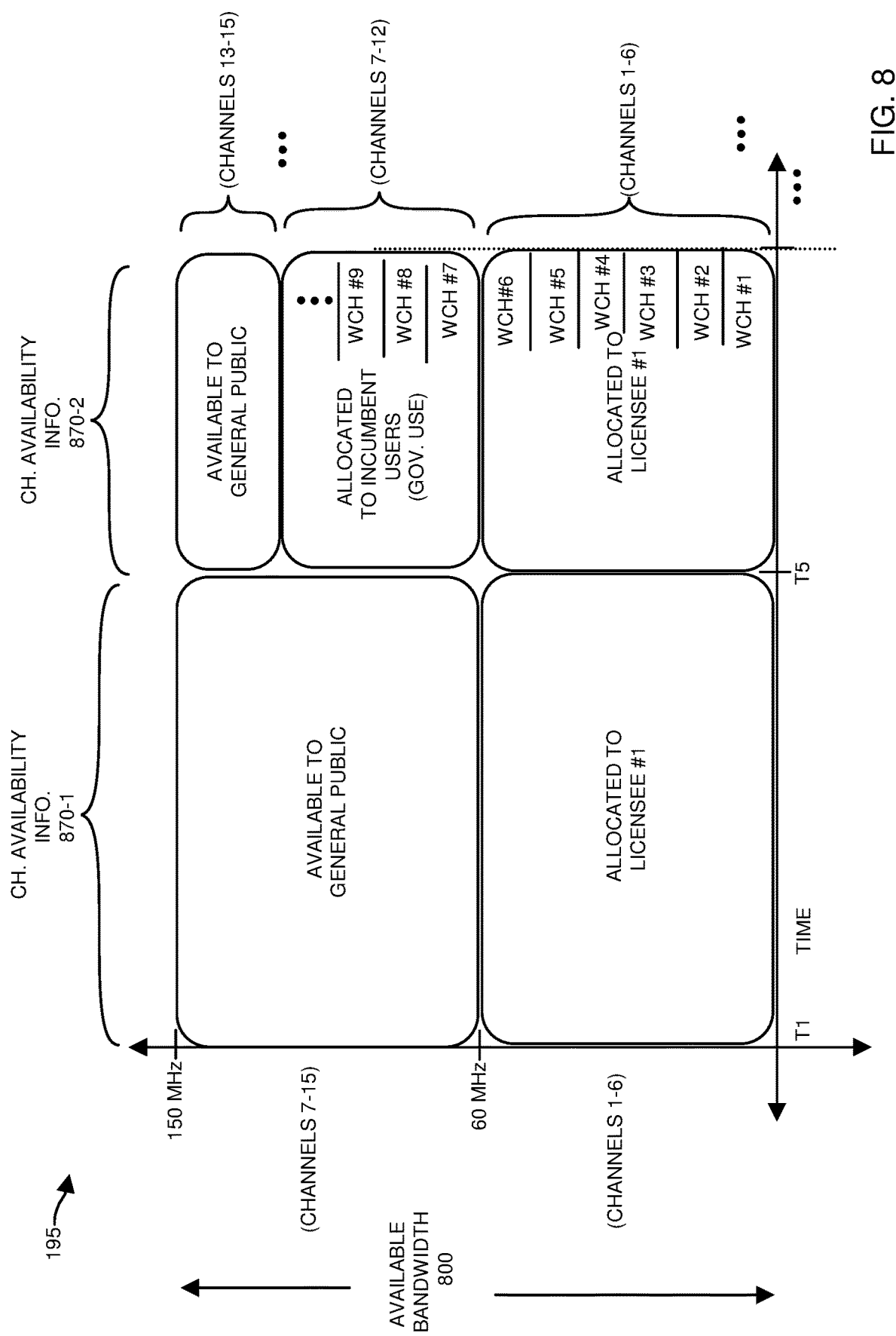
FIG. 8 is an example diagram illustrating allocation of wireless channels from a hierarchy of channels according to embodiments herein.

FIG. 8 is an example diagram illustrating generation of dynamic channel allocation information indicating allocation of bandwidth at different tiers of a channel hierarchy according to embodiments herein.

As previously discussed, allocation management resource 155 (such as spectrum access system or other suitable entity) keeps track, at any given time, which channels or portions of the multi-tier wireless spectrum or multi-tier radio band (such as CBRS band) are available in the geographical region in which the network environment 100 resides. If government use (a so-called incumbent user) is detected via appropriate input to the allocation management resource 155, certain channels are no longer available for use as shown in the content access information 870-1 and 870-2 as shown in FIG. 8.

In this example, the channel availability information 870-1 (an instance of allocation information 195) indicates that prior to time T5, channels 7-15 are available to the general authorized access users (general public or low priority users) for use; channels 1-6 are available for use by licensee #1. In a manner as previously discussed, the wireless base station 131 uses the allocated wireless channel #8 to provide wireless connectivity to one or more communication devices.

As further shown, at or around time T5, assume that the allocation management resource 155 receives input indicating use of a portion (channels 7-12) of the spectrum by an incumbent user such as the government. In such an instance, the allocation management resource 155 updates the channel availability information such that the channel allocation information 870-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the low priority users (i.e., general authorized access users).

In one embodiment, the allocation management resource 155 notifies the wireless base station 131 at or around time T5 that the wireless base station 155 is no longer able to use wireless channel #8.

Thus, the allocation management resource 155 allocates use of wireless channel #8 to the wireless base station 131 to provide communication devices 801, 802, etc., wireless access to the remote network 190 via respective wireless links between the communication devices and the wireless base station 131. The wireless base station 131 forwards communications received from the communication devices through the gateway 121 and 122 to the remote network 190. In a reverse direction, the wireless base station 131 receives communications from the remote network 190 through gateways 122 and 121 and forwards them to the appropriate communication device.

Between time T1 and time T5, the wireless base station 131 uses the wireless channel #8 to provide the communication devices 801, 802, etc., connectivity to the remote network 190. At or around time T5, the allocation management resource 155 deallocates use of the wireless channel #8 from the wireless base station 131 in favor of use of the wireless channel by the incumbent user after time T5.

This illustrates the dynamic availability of different wireless channels bandwidth as shared in network environment 100. If allocation management resource 155 allocates use of any channels 7-15 to any of base stations, then the allocation management resource 155 must de-allocate use of such wireless channels during conditions in which a higher priority so-called incumbent user relinquishes use of wireless channels 7-12 at or around time T5. In such an instance, as previously discussed, the allocation management resource 155 deallocates the wireless channels 7-12 from respective wireless stations for use instead by the incumbent user.

Figure 9:
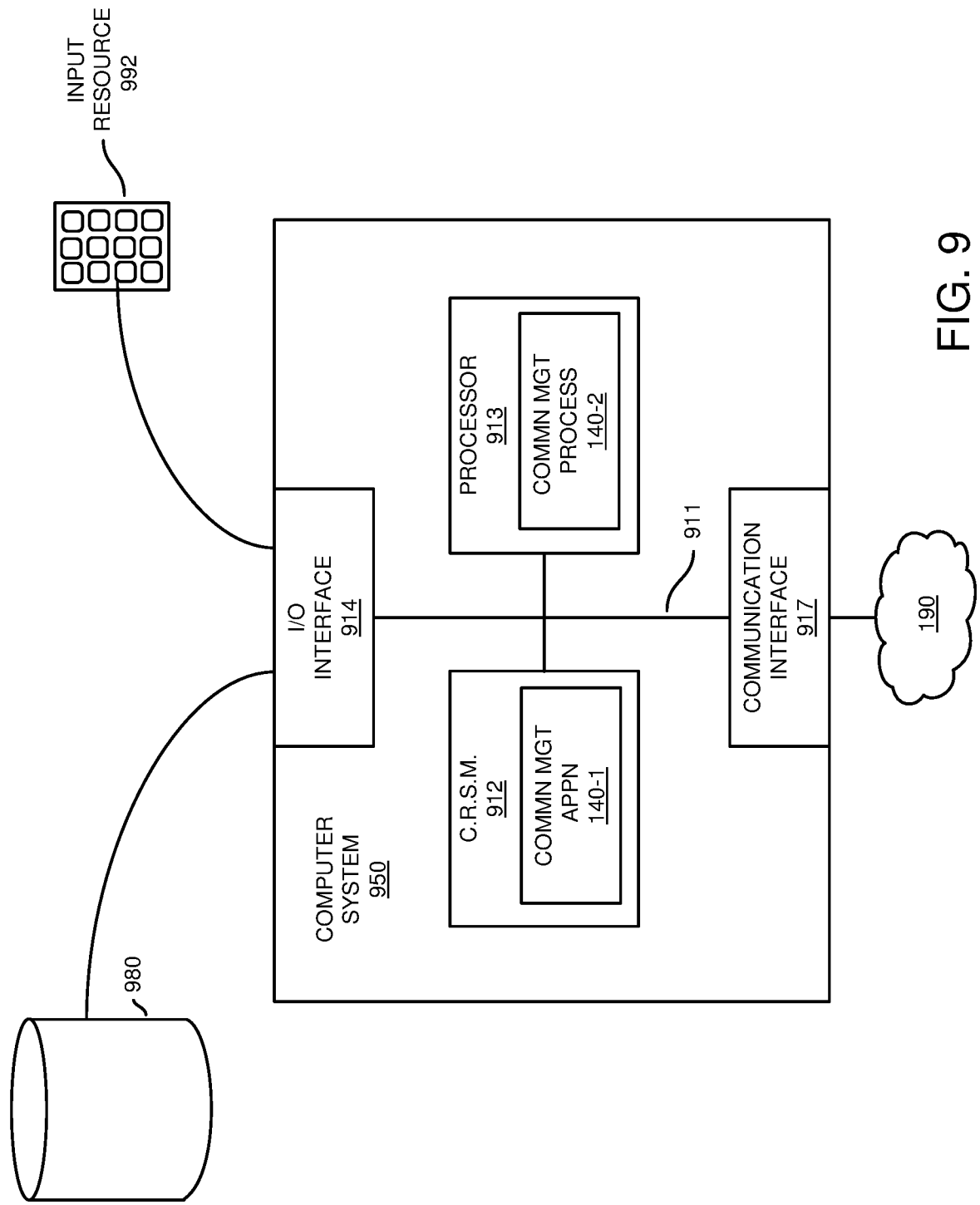
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as mobile communication devices, wireless base stations, communication management resource, converter resource, allocation management resource, etc. etc.) as discussed herein can be configured to include computer processor hardware and/or corresponding executable instructions to carry out the different operations as discussed herein via computer system 950.

As shown, computer system 950 of the present example includes an interconnect 911 that coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein. In other words, management application 140-1 can be configured to execute operations associated with wireless base station 131, gateway 121, gateway 122, communication management resource 140, allocation management resource 141, and/or allocation management resource 155.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein. In one embodiment, the control system 950 can include or be implemented in virtualization environments such as the cloud.

Functionality supported by the different resources will now be discussed via flowcharts in FIG. 10. Note that the steps in the flowcharts below can be executed in any suitable order.

Figure 10:
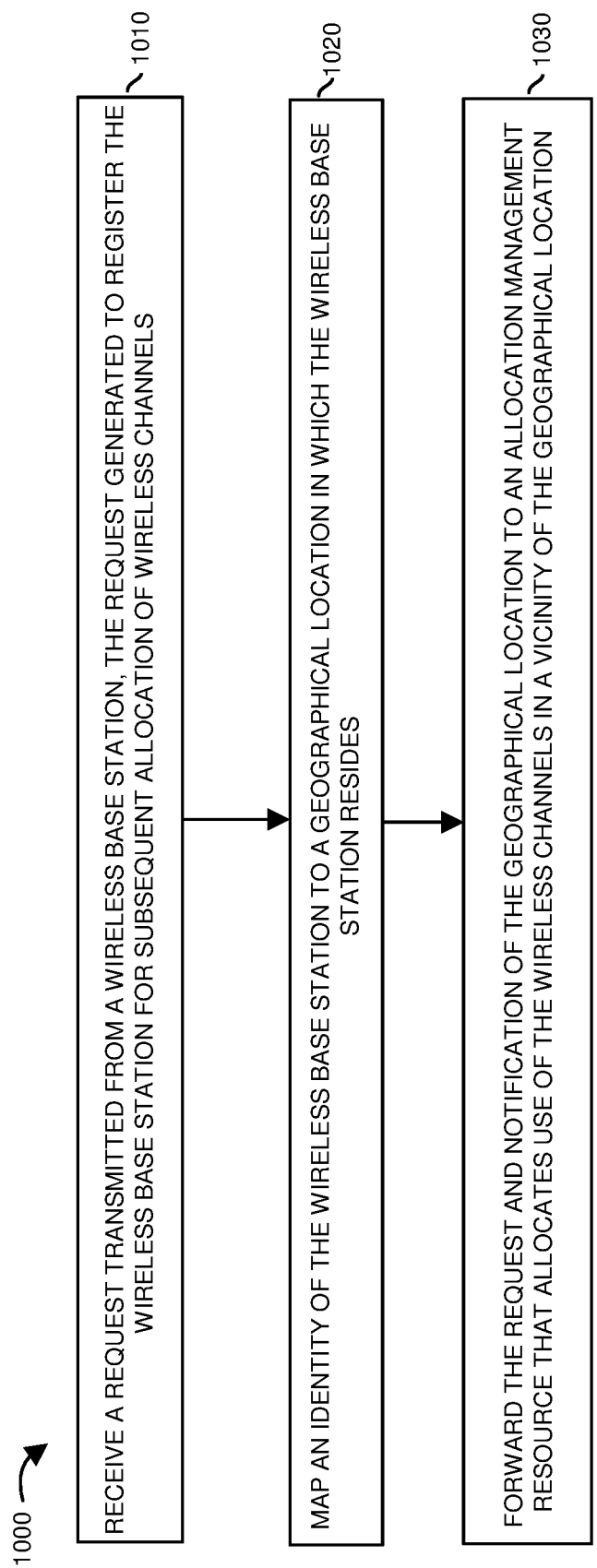
FIG. 10 is an example diagram illustrating a method according to embodiments herein.

FIG. 10 is a flowchart 1000 illustrating an example method according to embodiments. Note that flowchart 1000 overlaps/captures general concepts as discussed herein.

In processing operation 1010, the communication management resource 140 receives a request transmitted from a wireless base station 131. The wireless base station 131 generates the request to register the wireless base station 131 for subsequent allocation of wireless channels by a channel allocation resource 155.

In processing operation 1020, the communication management resource 140 initiates mapping (such as via a converter resource 141) an identity of the wireless base station 131 to a geographical location (such as L1) in which the wireless base station 131 resides.

In processing operation 1030, the communication management resource 140 forwards the request and notification of the geographical location L1 to an allocation management resource 155 that allocates use of one or more wireless channels in a region (in a vicinity of the location L1) in which the wireless base station 131 resides.

Note again that techniques herein are well suited to facilitate allocation of wireless channels in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving a request transmitted from a wireless base station, the request generated to register the wireless base station for subsequent allocation of a wireless channel;
   mapping an identity of the wireless base station to a geographical location in which the wireless base station resides; and
   forwarding the request and notification of the geographical location to an allocation management resource that allocates use of wireless channels in a region in which the geographical location resides.

2. The method as in claim 1, wherein mapping the identity of the wireless base station to the geographical location includes retrieving the identity of the wireless base station from the request and determining the geographical location from the retrieved identity of the wireless base station.

3. The method as in claim 1 further comprising:
   accessing stored information mapping the identity of the wireless base station to the geographical location.

4. The method as in claim 3, wherein the stored information includes:
   i) map information mapping the identity of the wireless base station to a network address assigned to the wireless base station;
   ii) connectivity information indicating installation of the wireless base station in a subscriber domain and connectivity of the wireless base station to a gateway communication device in the subscriber domain, the subscriber domain residing at the geographical location; and
   iii) location information indicating that the gateway communication device resides at the geographical location.

5. The method as in claim 4, wherein mapping the identity of the wireless base station to the geographical location includes:
   utilizing the map information, the connectivity information, and the location information to map the identity of the wireless base station to the geographical location.

6. The method as in claim 1 further comprising:
   prior to receiving the request:
   i) storing location information indicating that a gateway communication device resides at the geographical location;
   ii) detecting connectivity of the wireless base station to the gateway communication device through which the wireless base station transmits the request, the detected connectivity including receipt of a network address assigned to the wireless base station; and
   iii) based on the detected connectivity, storing connectivity information indicating the connectivity of the wireless base station to the gateway communication device.

7. The method as in claim 6, wherein mapping the identity of the wireless base station to the geographical location includes:
   translating an identity of the wireless base station to the network address of the wireless base station;
   detecting from the network address of the wireless base station and the connectivity information that the wireless base station is coupled to the gateway communication device;
   determining from the stored location information that the gateway communication device resides at the geographical location; and assigning the geographical location to the wireless base station in response to detecting that the gateway communication device resides at the geographical location and that the wireless base station is coupled to the gateway communication device.

8. The method as in claim 1 further comprising:
receiving a message from the allocation management resource, the message allocating a first wireless channel to the wireless base station; and
notifying the wireless base station of the first wireless channel allocated to the wireless base station.

9. The method as in claim 1, wherein mapping the identity of the wireless base station to the geographical location includes:
mapping the unique identifier value of the wireless base station to a network address assigned to the wireless base station.

10. The method as in claim 1, wherein the allocation management resource allocates use of the wireless channels from a tiered wireless communication hierarchy in which an incumbent user is ranked higher in priority than the wireless base station.

11. The method as in claim 1 further comprising:
receiving the request at a domain proxy and forwarding the request and notification of the geographical location from the domain proxy to the allocation management resource.

12. The system as in claim 1, wherein the wireless base station supports connectivity with communication devices via a first wireless channel allocated from the allocation management resource, the allocated first wireless channel being CBRS (Citizens Band Radio Service) bandwidth.

13. A system comprising:
a communication management resource operative to:
receive a request transmitted from a wireless base station, the request generated to register the wireless base station for subsequent allocation of a wireless channel;
map an identity of the wireless base station to a geographical location in which the wireless base station resides; and
forward the request and notification of the geographical location to an allocation management resource that allocates use of wireless channels in a region in which the geographical location resides.

14. The system as in claim 13, wherein the communication management resource is further operable to: retrieve the identity of the wireless base station from the request and determine the geographical location from the retrieved identity of the wireless base station.

15. The system as in claim 13, wherein the communication management resource is further operable to:
access stored information mapping the identity of the wireless base station to the geographical location.

16. The system as in claim 15, wherein the stored information includes:
i) map information mapping the identity of the wireless base station to a network address assigned to the wireless base station;
ii) connectivity information indicating installation of the wireless base station in a subscriber domain and connectivity of the wireless base station to a gateway communication device in the subscriber domain, the subscriber domain residing at the geographical location; and
iii) location information indicating that the gateway communication device resides at the geographical location.

17. The system as in claim 16, wherein the communication management resource is further operable to:
utilize the map information, the connectivity information, and the location information to map the identity of the wireless base station to the geographical location.

18. The system as in claim 13, wherein the communication management resource is further operable to:
prior to receiving the request:
i) store location information indicating that a gateway communication device resides at the geographical location;
ii) detect connectivity of the wireless base station to the gateway communication device through which the wireless base station transmits the request, the detected connectivity including receipt of a network address assigned to the wireless base station; and
iii) based on the detected connectivity, store connectivity information indicating the connectivity of the wireless base station to the gateway communication device.

19. The method as in claim 18, wherein the communication management resource is further operable to:
translate an identity of the wireless base station to the network address of the wireless base station;
detect from the network address of the wireless base station and the connectivity information that the wireless base station is coupled to the gateway communication device;
determine from the stored location information that the gateway communication device resides at the geographical location; and
assign the geographical location to the wireless base station in response to detecting that the gateway communication device resides at the geographical location and that the wireless base station is coupled to the gateway communication device.

20. The system as in claim 13, wherein the communication management resource is further operable to:
receive a message from the allocation management resource, the message allocating a first wireless channel to the wireless base station; and
notify the wireless base station of the first wireless channel allocated to the wireless base station.

21. The system as in claim 13, wherein the communication management resource is further operable to:
the unique identifier value of the wireless base station to a network address assigned to the wireless base station.

22. The system as in claim 13, wherein the allocation management resource allocates use of the wireless channels from a tiered wireless communication hierarchy in which an incumbent user is ranked higher in priority than the wireless base station.

23. The system as in claim 13, wherein the communication management resource is further operable to:
receive the request and forward the request and notification of the geographical location to the allocation management resource.

24. The system as in claim 13, wherein the wireless base station supports connectivity with communication devices via a first wireless channel allocated by the allocation management resource, the first wireless channel being CBRS (Citizens Band Radio Service) bandwidth.

25. Computer-readable storage hardware having instructions stored thereon, the instructions, when carried out by computer processor hardware, cause the computer processor hardware to:
- receive a request transmitted from a wireless base station, the request generated to register the wireless base station for subsequent allocation of a wireless channel;
- map an identity of the wireless base station to a geographical location in which the wireless base station resides; and
- forward the request and notification of the geographical location to an allocation management resource that allocates use of wireless channels in a region in which the geographical location resides.

26. The method as in claim 1, wherein mapping the identity of the wireless base station to the geographical location includes:
- mapping the identity of the wireless base station to a network address assigned to the wireless base station; and
- mapping the network address assigned to the wireless base station to a gateway communication device supporting connectivity of the wireless base station to a remote network.

27. The method as in claim 1, wherein mapping the identity of the wireless base station to the geographical location includes:
- mapping the identity of the wireless base station to a network address assigned to the wireless base station.

28. The method as in claim 27, wherein mapping the identity of the wireless base station to the geographical location in which the wireless base station resides further includes:
- mapping the network address assigned to the wireless base station to the geographical location.

29. The method as in claim 1 further comprising:
- receiving the request from the wireless base station through a gateway communication device providing the wireless base station access to a remote network.

30. The method as in claim 29 further comprising:
- mapping an identity of the gateway communication device to the geographical location.

31. The method as in claim 30 further comprising:
- determining the identity of the gateway communication device based on the identity of the wireless base station.

32. The method as in claim 1, wherein the identity of the wireless base station is a CBSD (Citizens Broadband radio Service Device) identity value.

33. The method as in claim 1 further comprising:
- mapping the identity of the wireless base station to the geographical location in response to detecting that the request does not specify the geographical location of the wireless base station.

34. The method as in claim 1 further comprising:
- forwarding the identity of the wireless base station to a converter resource that converts the identity of the wireless base station into the geographical location.

35. The method as in claim 1 further comprising:
- mapping an identity of a gateway communication device to the geographical location, the gateway communication device providing the wireless base station access to a remote network.

* * * * *

UNITED STATES PATENT AND TRADEMARK OFFICE
CERTIFICATE OF CORRECTION

| | |
|---|---|
| PATENT NO. | : 11,432,259 B2 |
| APPLICATION NO. | : 17/004653 |
| DATED | : August 30, 2022 |
| INVENTOR(S) | : Sarawat et al. |

It is certified that error appears in the above-identified patent and that said Letters Patent is hereby corrected as shown below:

In the Claims

Column 18, Line 46, before "the" add --map--

Signed and Sealed this
Eleventh Day of October, 2022

Katherine Kelly Vidal
*Director of the United States Patent and Trademark Office*